Patented Nov. 21, 1933

1,936,099

UNITED STATES PATENT OFFICE 1,936,099

PROCESS OF MANUFACTURING THIAZOLE DERIVATIVES

Robert L. Sibley, Nitro, W. Va., assignor to The Rubber Service Laboratories Co., Akron, Ohio, a corporation of Ohio No Drawing. Application June 21, 1930
Serial No. 462,931

6 Claims. (Cl. 260—44)

The present invention relates to a new process for the manufacture of a nitro-aryl-aryl thiazyl sulfid by reacting a mercapto-aryl-thiazole, preferably in the form of an alkali metal salt thereof, and a nitro chlor benzene compound in a liquid medium in which at least one of the reacting components is substantially insoluble.

The preferred process as disclosed hereinafter comprises reacting an alkali metallic salt of a mercapto-aryl-thiazole and a nitro chlor benzene in the presence of water as a reaction medium, to form the corresponding nitro-aryl-aryl thiazyl sulfid, thereby effecting a substantial saving in the cost of manufacturing of said thiazyl sulfid product and producing a high yield of a pure product. Other advantages are also realized by operating according to the process comprising the present invention as are apparent from the description and examples hereinafter set forth.

One of the type of compounds disclosed herein, namely dinitro-phenyl-benzo thiazyl sulfid, previously has been described as prepared by dissolving mercapto benzothiazole in a mixture of sodium hydroxide solution and alcohol and adding dinitrochlor-benzene thereto while maintaining a temperature of 50 to 60° C. until complete solution of all materials is effected. The solution is then cooled, whereupon the desired product separates. There are many disadvantages to this process in that the process is costly to carry out, solvent losses are high, yields of product are relatively low and are not uniform and an unnecessary amount of time is required to complete the reaction.

The disadvantages of the hereinbefore described process have been overcome and an improved product in high yield has been readily obtained by operating in the manner as set forth in the following example.

*Example 1.*—2-4 dinitro phenyl benzo thiazyl sulfid has been prepared as follows: Substantially one molecular proportion of mercapto benzothiazole (167 parts) was dissolved in an equivalent amount of a weak alkali, for example a 5% aqueous sodium hydroxide solution, thereby forming the sodium salt of mercapto benzothiazole, and slightly less than an equivalent amount (200 parts) of dinitrochlorbenzene, which is substantially insoluble in a water medium, was added thereto, preferably in a molten condition. The reaction mixture was thoroughly agitated by any convenient means for a period of time required to complete the reaction desired, for example from two to four hours at a temperature of approximately 60 to 70° C. While any form of agitation which produces intimate mixing while avoiding the formation of pellets may be employed, it is preferred that the desired agitation be obtained by rotating the mixture by any convenient means providing efficient inter-mixture of the ingredients, as for example in a ball mill. The 2-4 dinitro phenyl benzo thiazyl sulfid so formed was isolated from the mass preferably by filtration and after washing with water until substantially neutral in reaction and dried, was obtained as a finely divided yellow powder, the yield of which was practically theoretical. Although the product obtained is of a high degree of purity, the material may be further purified, if desired, by any convenient means as for example by recrystallization from an organic solvent such as ethyl alcohol.

The process set forth in the preceding example has been modified in operating detail without affecting the desirable results realized, by slowly adding over a period of approximately three hours, the required quantity of dinitrochlorbenzene, maintained at a temperature slightly above its melting point, to a solution of mercapto benzothiazole in a 5% sodium hydroxide solution maintained at 60 to 70° C. The mass was thoroughly mixed by means of efficient agitation during the addition of the dinitrochlorbenzene and for approximately 30 minutes thereafter, whereupon the mass was filtered, washed, and the desired reaction product obtained.

The reaction product described, namely dinitro phenyl benzo thiazyl sulfid, is useful as an accelerator of the rubber vulcanization process and is particularly useful in that process when admixed with an activating basic accelerator such as diphenyl guanidine. A particularly effective and intimate mixture for such use was prepared by dissolving 167 parts of mercapto benzothiazole in approximately 800 parts of 5% caustic soda solution and adding to this solution approximately 372 parts of diphenyl guanidine hydrochloride. The mass was then heated to a temperature between 60 to 70° C. and 202 parts of dinitrochlorbenzene, liquefied by heating, were added. The mass was agitated in a ball mill as before for two to four hours while maintaining the temperature above the melting point of the nitro chlor benzene compound employed. When the reaction was completed, sufficient caustic soda solution was added to the mass, while continuing the stirring action, to precipitate completely the diphenyl guanidine from its salt. The mass was then filtered and the product dried at a temperature between 100 to 110° C. The product was then ready for use as a rubber vulcanization accelerator. By proceeding in the manner described, the diphenyl guanidine is uniformly distributed in a finely divided state throughout the mass of dinitro phenyl benzo thiazyl sulfid. Other suitable amines may be employed in place of diphenyl guanidine in the manner set forth in the example.

Mercapto benzothiazole, mercapto tolylthiazole, mercapto xylylthiazole and analogous compounds may be reacted with other nitro chlor benzene compounds than 2-4 dinitrochlorbenzene according to the preferred method given above. Moreover, mercapto benzothiazole, mercapto tolylthiazole, mercapto xylylthiazole, their alkali metallic salts and the like may be reacted with mono-p-nitro chlor benzene, with 2-4 dichlor nitro benzene and their equivalents in the presence of a reaction medium, for example water, in which one of the reacting components is substantially insoluble, to form the corresponding nitro-aryl-aryl thiazyl sulfid.

The present invention is limited solely by the claims attached hereto as a part of this specification, wherein it is intended to claim the invention as broadly as possible in view of the prior art.

I claim:

1. A method of making a nitro phenyl-benzothiazyl-sulfide which consists in heat treating a mercapto-benzothiazole with a nitro-chlorbenzene in water.

2. A method of making a nitro phenyl-benzothiazyl-sulphide which consists in heat treating an alkali metallic salt of a mercapto-benzo-thiazole with a nitrochlorbenzene in water.

3. A method of making a dinitro-phenyl-benzothiazyl-sulfide which consists in heat treating the sodium salt of a mercaptobenzothiazole with dinitrochlorbenzene in water.

4. A method of making dinitro-phenyl-benzothiazyl-sulfide which consists in heat treating the sodium salt of mercaptobenzothiazole with dinitrochlorbenzene in water.

5. A method of making dinitro-phenyl-benzothiazyl-sulfide which consists in heat treating mercaptobenzothiazole with an aqueous solution of sodium hydroxide, adding dinitrochlorbenzene thereto, and heating until the reaction is complete.

6. A method of making 2,4 dinitrophenyl-benzothiazyl-sulfide which consists in heat treating substantially one molecular proportion of mercaptobenzothiazole with substantially an equivalent quantity of 5% aqueous sodium hydroxide, adding thereto slightly less than an equivalent quantity of dinitrochlorbenzene, heating said reactants for substantially two to four hours at a temperature of substantially 60 to 70° C. and isolating the 2,4 dinitro-phenyl-benzo-thiazyl-sulfide formed.

ROBERT L. SIBLEY.